United States Patent
Pickreign et al.

(12) 
(10) Patent No.: US 6,842,790 B2
(45) Date of Patent: Jan. 11, 2005

(54) HOST COMPUTER VIRTUAL MEMORY WITHIN A NETWORK INTERFACE ADAPTER

(75) Inventors: Heidi R. Pickreign, Harvard, MA (US); Laxminarayan Krishnamurthy, Acton, MA (US); Robert Reissfelder, Westwood, MA (US)

(73) Assignee: 3Com Corporation, Santa Clara, CA (US)

(*) Notice: Subject to any disclaimer, the term of this patent is extended or adjusted under 35 U.S.C. 154(b) by 0 days.

(21) Appl. No.: 10/836,852

(22) Filed: Apr. 30, 2004

(65) Prior Publication Data

US 2004/0205319 A1 Oct. 14, 2004

Related U.S. Application Data

(63) Continuation of application No. 09/590,892, filed on Jun. 9, 2000, now Pat. No. 6,732,249.

(51) Int. Cl.[7] ............................................. G06F 13/14
(52) U.S. Cl. ..................... 709/245; 711/202; 710/52; 709/212
(58) Field of Search .................... 711/202; 709/238, 709/249, 212, 245, 236, 200; 710/64, 104, 52; 370/392

(56) References Cited

U.S. PATENT DOCUMENTS

6,446,203 B1 * 9/2002 Aguilar et al. ................. 713/2
6,539,338 B1 * 3/2003 Pickreign et al. ........... 702/185

* cited by examiner

Primary Examiner—Pierre-Michel Bataille
(74) Attorney, Agent, or Firm—Weingarten, Schurgin, Gagnebin & Lebovici LLP

(57) ABSTRACT

A system and method of mapping a host computer address space into a network interface adapter (NIA) address space. A network interface processor within the NIA requests a memory allocation from the host computer. The host computer responds with an assigned base address in the host computer address space, and a length defining the contiguous addresses within the host computer address space equal to the allocation requested by the NIA processor. A hardware trap is set such that an interrupt to the NIA processor is generated when the host computer attempts to access data at an address within the allocated address range of host computer contiguous addresses. The network interface processor translates the received host address to a physical address within the NIA address space, reads the data at the respective NIA physical address, and transfers the data to the host computer.

16 Claims, 3 Drawing Sheets

HOST COMPUTER VIRTUAL MEMORY WITHIN A NETWORK INTERFACE ADAPTER

CROSS REFERENCE TO RELATED APPLICATIONS

This application is a continuation of U.S. patent application Ser. No. 09/590,892 filed Jun. 9, 2000 entitled HOST COMPUTER VIRTUAL MEMORY WITHIN A NETWORK INTERFACE ADAPTER now U.S. Pat. No. 6,732,249 to issue May 4, 2004.

STATEMENT REGARDING FEDERALLY SPONSORED RESEARCH OR DEVELOPMENT

N/A

BACKGROUND OF THE INVENTION

The present application relates generally to computer software boot techniques, and more particularly to the execution of computer boot techniques within a network interface adapter.

In a typical computer system interconnected to a network, a network interface adapter (NIA) acts as an interface between the host computer and a computer network. The NIA performs the necessary interface functions for transmitting and receiving data over the computer network. The NIA includes a memory for storing data or software program code images that the host computer utilizes in communicating over the computer network. As such, the data and software program code images must be accessible to the host computer in order to be accessed and utilized by the host computer. In order for these resources to be accessible to the host computer, they must be included in the host computer address space. To be included within the host computer address space, these resources need to have memory addresses assigned to them that are accessible by the host computer.

Prior art systems have stored such data and software program code images in serial EEPROMs. However, a bottleneck may exist in the transfer of a data image or a code image from the NIA to the host computer due to the serial nature and speed of such EEPROMs.

It would therefore be desirable to have an NIA that is capable of storing data and software program code images having a non-static host address, and of transferring the data and software program code images stored at an NIA address, which is specifiable and is independent of the host computer address, to the host computer more efficiently.

BRIEF SUMMARY OF THE INVENTION

Consistent with the present invention, a system and method are disclosed for accessing a data image stored within a network interface adapter (NIA) by a host computer. Upon boot up, the NIA requests an allocation of memory space from the host computer that may be accessed by the host computer. The host computer responds with an individual base address and memory allocation. Each of the base addresses supplied is within the host computer address space. When the host computer attempts to read data contained within the address space assigned to the NIA, the address is trapped on the NIA, and the NIA processor is notified. The NIA processor reads the address requested by the host computer, and translates the address in the host computer address space into a physical address in the NIA address space. Upon locating the data at the applicable physical address, the NIA processor transfers the data to the host computer.

Other features, functions, and aspects of the invention will be evident from the Detailed Description of the Invention that follows.

BRIEF DESCRIPTION OF THE SEVERAL VIEWS OF THE DRAWING

The invention will be more fully understood from the following detailed description taken in conjunction with the accompanying drawings in which.

DETAILED DESCRIPTION OF THE INVENTION

U.S. patent application Ser. No. 09/590,892 filed Jun. 9, 2000 entitled HOST COMPUTER VIRTUAL MEMORY WITHIN A NETWORK INTERFACE ADAPTER is hereby incorporated herein by reference.

Consistent with the present invention, a system and method of performing a virtual boot of data in a network interface adapter (NIA) is disclosed. The host computer reads a PCI configuration register that has been loaded with a predetermined request for the memory needed for the BIOS ROM. The host computer responds with an assigned base address in the host computer address space, and an allocation of a range of contiguous addresses within the host computer address space equal to the amount of memory requested by the NIA processor. A hardware trap within the NIA is set to occur on the base address and the range of contiguous addresses assigned to the NIA by the host computer such that, when the host computer attempts to access an address within the range of contiguous addresses, the network interface processor is notified. In response to notification of the receipt of an address within the specified range, the network interface processor translates the address within the host computer address space to a physical address within the NIA address space. The network interface processor then locates and transfers the contents of the address(es) to the host computer. As used herein, "data" may include software program code, or any other information used by a software program during execution.

Figure 1:
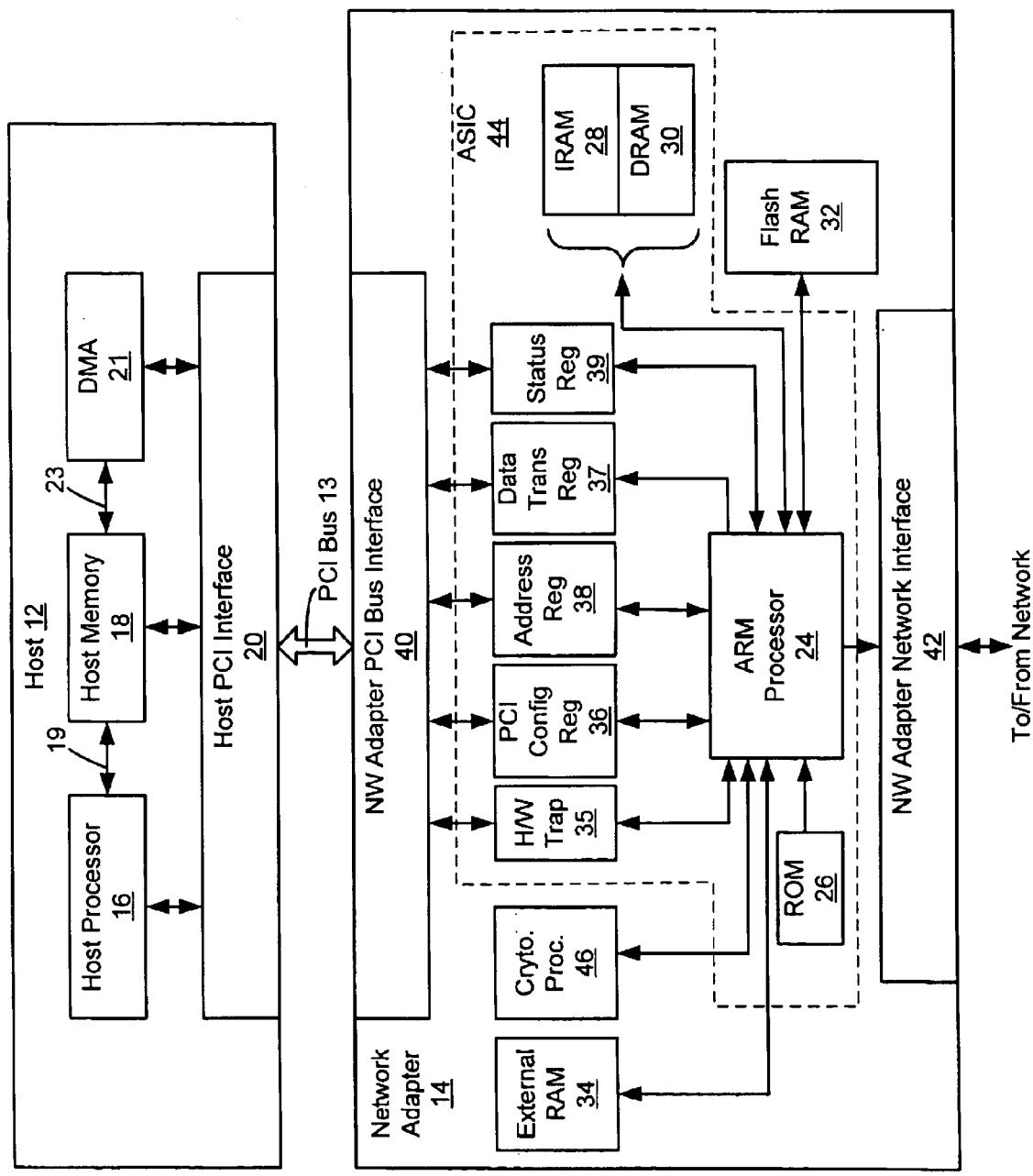
FIG. 1 is a block diagram of a system that includes a network interface adapter operative to perform a virtual boot transfer of a software program code image stored in a memory within a network interface adapter to a host computer, in accordance with the presently disclosed invention.

FIG. 1 depicts a system 10 including a NIA 14 that is capable of performing a virtual boot of a data image or a software program code image under the control of a NIA processor 24 within the NIA 14, according to the present invention. The processor may comprise an Advanced Reduced Instruction Set Computer (RISC) Machine (ARM) processor integrated on an application specific integrated circuit (ASIC) 44 with other components, as discussed later in greater detail. The NIA 14 includes a PCI interface 40 that couples the network interface processor 24 to a PCI bus 13 via a plurality of registers. These registers can include PCI configuration registers 36, address registers 38, data transfer registers 37, and status registers 39. In the presently disclosed embodiment, the PCI configuration registers 36 comprise a plurality of registers that are used to pass configuration requests from the NIA 14 to the host computer 12, configuration responses from a host computer 12 to the NIA 14, and configuration data between both the NIA 14 and the host computer 12. The address registers 38 comprise a plurality of registers, and are used to pass an address or addresses to the NIA containing data or software program code required by the host computer. The addresses passed to the NIA from the host computer will be located within the host computer address space. The data transfer registers 37 are employed in the transmission of data, software program code, or other information between the NIA 14 and the host computer 12. The status registers 39 may be used to provide a status indicator of whether the host computer is reading or writing data to a memory location in the NIA memory.

A ROM 26, External RAM 34, Instruction RAM 28, Data RAM 30, and Flash RAM 32 are coupled to the NIA processor 24 to enable the processor 24 to read and write instructions and data from and to the respective memories, as applicable. A cryptographic processor 34, may be coupled to the NIA processor 24. The cryptographic processor 34 is employed to accelerate cryptographic functions within the NIA 14. The NIA processor 24 is also coupled to a NIA network interface 42, which is coupled to a network to permit reception and transmission of information over the network. A hardware logic or state machine 35 is coupled to the PCI Bus Interface 40 and to the ARM processor 24. The hardware logic or state machine 35 traps on an address on the PCI bus interface 40 that is within a predetermined address range, and notifies the ARM processor 24 thereof.

In the presently disclosed embodiment, the NIA is coupled to the host computer 12 via a host PCI interface 20. The host computer 12 includes a host processor 16, a host memory 18, and control logic 19. The host processor 16 is communicably coupled to the host memory 18 and the host PCI interface 20.

The NIA 14 may be fabricated integrally on a motherboard with host computer electronics or alternatively as a separate network interface adapter card.

As indicated above, the NIA processor 24 may comprise an ARM processor. The ARM processor may be integrated on the ASIC 44 along with the ROM 26, IRAM 28, DRAM 30, the PCI configuration registers 36, the address registers 38, the data transfer registers 37, and the hardware logic or state machine 35.

More specifically, the NIA 14 provides a request for configuration data from the host computer 12 via the PCI configuration data registers 36, the PCI bus interface 40, the PCI bus 13, and the host PCI interface 20. Such configuration data can include a request for address assignments within the host computer address space from the host computer for resources within the NIA. Such a request can be made, for example, for address assignments associated with the input/output (I/O) of the NIA 14, the RAM or ROM memory contained within the NIA 14, and BIOS ROM used by the NIA 14. Memory addresses for data images and software program code images are contained within the Flash RAM 32. In a preferred embodiment, the NIA 14 requests a BIOS ROM address for netboot code contained within the Flash RAM 32.

Additionally, the host computer 12 can request to read data assigned within in its own memory space that is physically located within the NIA 14 by providing an address to the NIA processor via the address registers 38. As will be explained in more detail below, the physical memory contained within the NIA 14 has a different physical address than that assigned by the host computer 12 in the configuration response. Accordingly, when the NIA processor 24 is notified that the host computer 12 is requesting to read data from an address within the host computer address space assigned to the NIA 14, the NIA processor 24 translates that address to a physical address contained within the NIA address space. As discussed in more detail below, in one embodiment, in which the data being retrieved by the host computer 12 resides within the Flash RAM 32, the NIA processor locates the physical address of data being retrieved within the Flash RAM 32. As will be discussed below, the Flash RAM 32 includes a section containing section headers that include a pointer to the beginning of each section. Using the address from the host computer, the NIA processor computes an offset from the assigned base address, and uses this offset to locate the physical address of the data within the particular section of the Flash RAM 32. The NIA processor 24 then transfers the data associated with the address to the host computer. Thus, the operation of translating from a virtual boot memory address to a physical address is completely transparent to the host computer 12.

A technique for translating between the host address space and the NIA address space to facilitate reading from and writing to the NIA address space is described below. In the case of a read operation, the NIA processor translates the host address as described herein, retrieves the data from an NIA memory such as the Flash RAM at the location(s) specified by the translated address(es), and writes the data into the data transfer registers for transmittal to the host computer. In the case of a write operation, the NIA processor translates the host address as described herein, retrieves the data from the data transfer registers 37, and writes the data into the desired physical memory location in the NIA memory.

The hardware logic or state machine 35 is responsible for monitoring the PCI bus interface 40 and notifying the NIA processor 24 when one or more predetermined conditions occur. The hardware logic or state machine 35 may be either a combinatorial logic or a state machine that is operative to monitor certain bus, address, or data lines for an occurrence of these certain conditions. These predetermined conditions may include particular addresses that are being accessed by the host computer 12, predetermined data, or commands. More specifically, the hardware logic or state machine determines whether the respective host operation is a read or a write operation, and sets the appropriate status bit in the status register to identify the operation, as applicable. The hardware logic or state machine 35 also monitors the PCI bus interface 40 for an address within the host computer address space that has been assigned to the NIA 14. The hardware logic or state machine 35 is further operative to notify the NIA processor 24 upon the occurrence of one of the predetermined conditions. This notification may be in the form of an interrupt to the NIA processor 24 or via a status bit accessible to the NIA processor 24.

Figure 2:
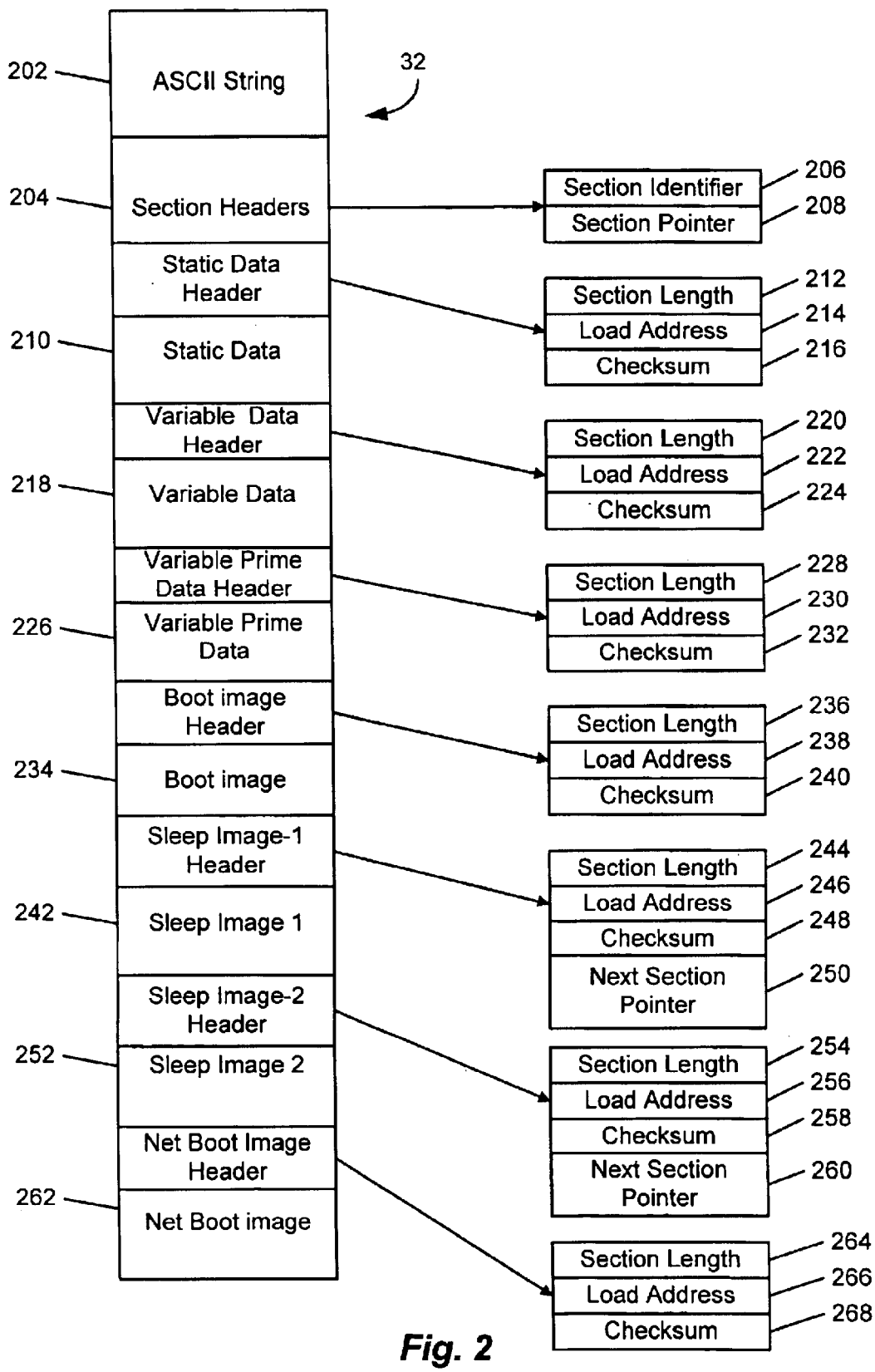
FIG. 2 is a graphical illustration of a memory map of an exemplary Flash RAM used to transfer a software program code image stored in a memory within a network interface adapter to a host computer.

The organization of the Flash RAM 32 in the presently disclosed system is illustrated in FIG. 2. In a preferred embodiment, the Flash RAM 32 comprises a serial device that is organized as a paginated memory and contains 512 pages. The Flash Ram contains 264 bytes per page.

The first entry in the Flash RAM 32 is a unique ASCII string 202 that may be verified by the processor to indicate that the Flash RAM 32 has been loaded with the appropriate code image. The next entries in the Flash RAM 32 include section headers 204. The section headers may include two entries. The first entry is a section identifier 206 that identifiers the code within the respective section. The second entry in the section headers 204 is a section pointer 208 that provides a software pointer to the address of the first location within the section corresponding to the section identifier. In a preferred embodiment, there are a maximum of 16 sections stored within the Flash RAM 32.

A static data section 210 may contain static configuration data such as the PCI device identifier, MAC address, and serial numbers and other manufacturing parameters of the NIA. In one embodiment, the NIA includes a PCI device ID that signifies the type of cryptographic processor expected to be populated on the NIA. The static data section 210 also includes a header portion located at the beginning of the section. The header portion contains a section length parameter 212, a load address 214, and a checksum 216 derived from the data stored within static section 210. Although the header portion associated with the static data section 210 contains a load address, it is not used in the presently illustrated embodiment.

Variable data section 218 may contain variable configuration data, which is typically the configuration data for the NIA. This variable data may include the factory default configuration data and in one embodiment, may be modified by a user. The variable data section 218 also includes a header portion located at the beginning of the variable data section 218 containing a section length parameter 220 that defines the length of the respective section, a load address 222 that specifies the memory location in NIA memory at which to store the variable data and a checksum 224 derived from the data stored within the variable section 218. Although the section header associated with the variable data section 218 contains a load address, this load address is not used.

Variable prime data section 226 may contain factory default configuration settings for the NIA that are used as a data backup for the variable data stored in variable data section 218. In one embodiment, to ensure the integrity of the data stored in this page, the user is unable to over-write that data stored in this section. The variable prime data stored in variable prime data section 226 of the Flash RAM 32 may be used by the host processor to rewrite certain invalid data values stored in other pages and sections within the Flash RAM 32. Variable prime data section 226 includes a header portion located at the beginning of the section containing a section length parameter 228 defining the length of the respective section, a load address 230 that specifies the NIA memory address, and a checksum 232 derived from the data stored within variable prime section 226. Although the header portion contains a load address, this load address is not used.

A boot image section 234 contains the boot software for the NIA. This boot software code includes self diagnostic software code herein discussed. Preferably the boot image code is stored in contiguous pages of memory within the boot image section 234 or may be stored in contiguously linked pages. The boot image section 234 also includes a header portion located at the beginning of the boot image section 234. The header portion contains a section length parameter 236 that defines the length of the boot image section 234, a load address 238 that provides the address where the boot software code is to be loaded in NIA memory, and a checksum 240 derived from the data stored within the boot image section 234.

The sleep image code may be divided into a number of sections, depending on the system requirements. The sleep code may be divided into a plurality of sections, each being loaded into a different RAM module in the NIA. The Sleep image-1 section 242 contains the first section of the sleep software code. The Sleep image-1 section 242 includes a header portion located at the beginning of the section. The header portion contains a section length parameter 244 defining the length of the sleep image section, a load address 246 that defines the memory and address where the first section of the sleep software code is to be loaded, a checksum 248 derived from the software code stored within the sleep image-1 section 242, and a next-section-pointer 250. The next section pointer 250 provides a software pointer link to the location in the Flash RAM 32 where the subsequent section of sleep software code is stored.

In the embodiment illustrated in FIG. 2, a second sleep image section, i.e., sleep image-2 section 252, is provided. Sleep image-2 section 252 provides a second section of sleep software code that will be loaded into a different RAM module than the sleep image-1 software code. A header portion is located at the beginning of the section. The header portion contains a section length parameter 254 that defines the length of the sleep image-2 section, a load address 256 identifying the memory and address into which the sleep image-2 section is to be loaded, a checksum 258 derived from the software code stored within the sleep image-1 section 242, and a next-section-pointer 260. The next section pointer 260 provides a software pointer link to the location in the Flash RAM 32 where the subsequent section of sleep software code is stored, if a sequential section is present. It should be understood that there may be as many sections of sleep software code as needed for a given system.

The netboot image section 262 contains the Net boot software code and contains the code for establishing the communication parameters between the NIA and the network. The Net boot image section includes a header portion located at the beginning of the section. The header portion includes a section length parameter 264, a load address 266 providing an address where the Net boot software code could be loaded, and a checksum 268 derived from the data stored within the Net boot image section 262. Although the header portion associated with the netboot image section 262 contains a load address, it is not used in the presently illustrated embodiment.

During the boot up process, the NIA 14 requests memory allocations from the host processor 24, for a certain amount of memory sufficient to accommodate information to be transferred from the NIA to the host. The host processor assigns for each such allocation a base address within the host address space, and a length defining contiguous memory addresses within the host address space. This allocation establishes a range of addresses within the host computer address space that will accommodate the information to be transferred from the NIA 14. This allows the host processor to access the NIA memory by reading data contained at a memory address within the host address space. Hardware logic or state machine 35 monitors the interface between the NIA 14 and the host computer 12 and traps on an address that is within the range of memory addresses assigned by the host computer to the NIA. The NIA processor 24 is notified (preferably by an interrupt) when the host computer is attempting to access one or more addresses within the range of addresses assigned to the NIA 14. The NIA processor 24 reads the address(es) written to the address registers 38 by the host computer and translates the host computer address(es) into a physical address contained within the NIA address space. The NIA processor 24 then transfers the requested data from the respective physical NIA memory address to the host computer using the data registers 37.

Figure 3:
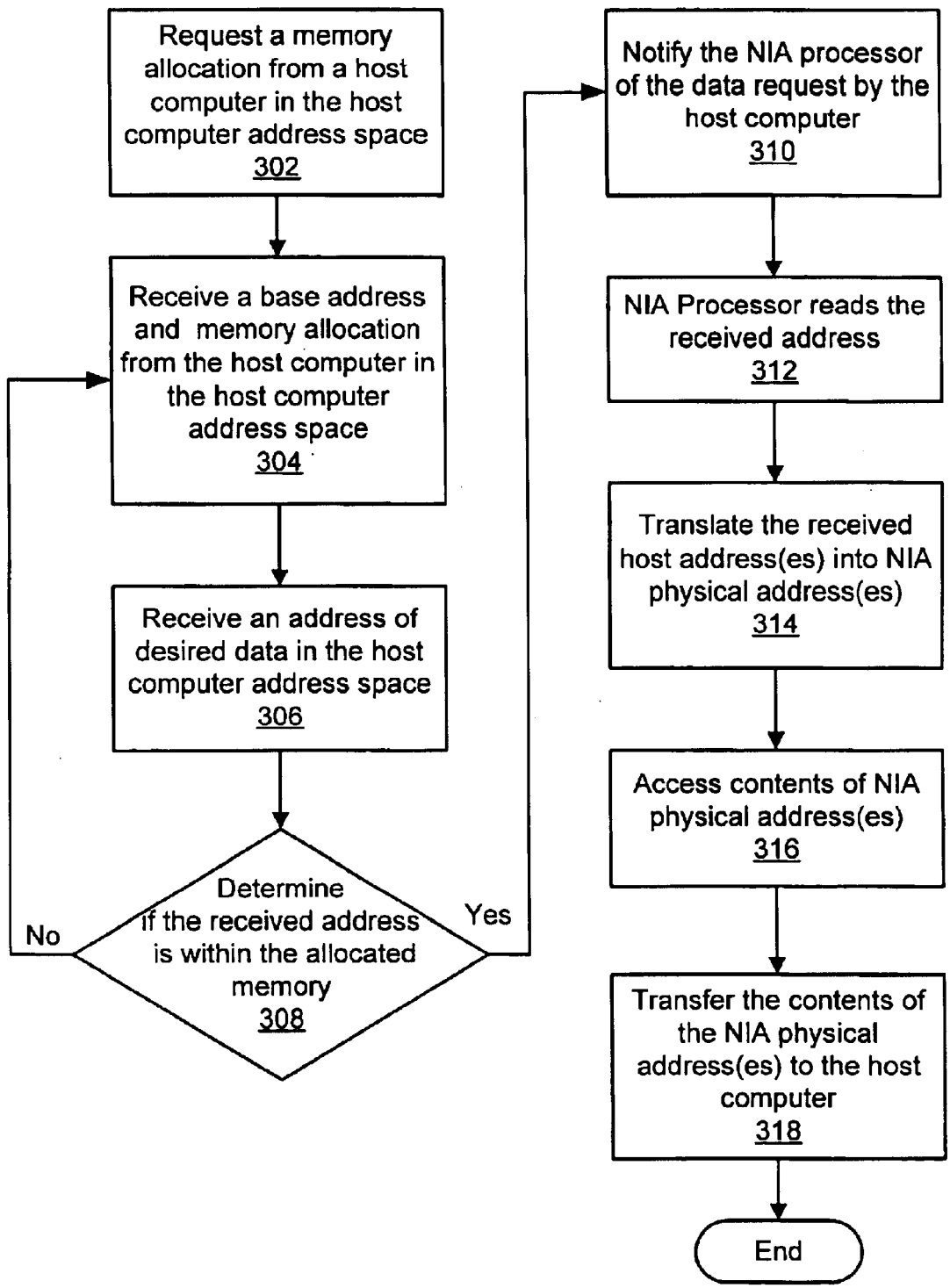
FIG. 3 is a flow chart illustrating one embodiment of a method to transfer a software program code image stored in a memory within a network interface adapter to a host computer.

The method of translating from a host address space to an NIA address space is further described in the flow diagram of FIG. 3. The NIA processor 24 requests a memory allocation within the address space of the host computer 12, as depicted in step 302. The NIA processor 24 may request memory allocations for various functions such as the I/O of the NIA 14, the memory space contained within the NIA 14, and the ROM BIOS of the NIA 14. The host computer 12 responds to the NIA with a base address within the host address space for each memory allocation requested by the NIA 14, and a length that defines the allocated size of the contiguous address space within the host computer 12, as depicted in step 304. Each function therefore receives a base address and a contiguous range of memory addresses extending from the assigned host computer base address. Each NIA memory allocation request, however, does not have to be contiguous in the host computer address space or with any other host computer allocation.

The host computer requests data contained within an NIA memory, and provides to the NIA a host computer address within the range of memory addresses assigned by the host computer to the NIA, as depicted in step 306. The host address is checked to verify that it is within the address space assigned by the host computer 12 to the NIA 14, as depicted in step 308. A high speed processor, combinatorial logic, or a state machine may be used to trap the incoming address within the specified range. If the address received from the host computer is within the range of host computer addresses allocated to the NIA 14, then the NIA processor 24 is notified that the host computer 12 is requesting data from the NIA 14, as depicted in step 310. The NIA processor 24 reads the address or addresses in the address register 38, as depicted in step 312.

The NIA processor 24 translates the received host address into a physical address contained within the NIA address space, as depicted in step 314. For example, if the NIA 14 requested a memory allocation for the BIOS ROM to be assigned to the netboot code, then as described above, the netboot code would receive a particular base address and a contiguous range of memory addresses within the host computer address space having a length equal to the netboot code length. Accordingly, for the host computer to access a memory address that is within the Bios ROM address range, the NIA processor will locate the netboot code section within the NIA address space. The data may be contained within the Flash RAM 32, and the NIA processor 24 can utilize the section header section 204 of the Flash RAM 32 to locate the particular section within it.

The NIA processor 24 accesses the contents of the physical address within the NIA address space that corresponds to the host computer address, as depicted in step 316. The NIA processor may determine the offset of the host computer address from the host computer assigned base address. Using this offset, the NIA processor locates the desired data within the physical memory of the NIA address space by accessing the contents that are offset from the beginning address of the physical memory section within the NIA address space in which the data resides. In one embodiment, in which the Flash RAM 32 contains the data, the NIA processor 24 locates the address of the desired data as the offset distance from the beginning of the above-identified section.

The NIA processor 24 transfers the desired data to the host computer 12, as depicted in step 318. The NIA processor reads the desired data, and transfers the desired data to the host computer via the data transfer registers 37, the PCI bus interface 40, the PCI bus, and the host PCI interface 20.

Those of ordinary skill in the art should further appreciate that variations to and modifications of the above-described method and system may be made without departing from the inventive concept disclosed herein. Accordingly, the invention should be viewed as limited solely by the scope and spirit of the appended claims.

What is claimed is:

1. A computerized device adapted to load a netboot code image into at least one respective computerized device communicably coupleable thereto, comprising:

a processor;

a first memory communicably coupled to the processor;

a first register containing a predetermined code size value of the netboot code image; and at least one buffer readable by at least one second computerized device communicably coupled thereto, the second computerized device having an associated second memory, wherein the processor is operative to receive a read address corresponding to the netboot code image from the second computerized device, to determine whether the read address is within an address range between a first base address associated with the second memory and the first base address plus the predetermined code size value, the first base address being mapped to a base physical address identifying a physical address location within the first memory, and in the event the read address is within the address range, to determine an offset between the read address and the first base address, to locate within the first memory a target address specified by the base physical address plus the offset to identify a target memory location at which the netboot code image is stored, and to transfer the netboot code image stored at the target memory location to the buffer readable by the second computerized device.

2. The computerized device of claim 1 wherein the netboot code image comprises a boot code image for predetermined network operating system software.

3. The computerized device of claim 1 further including a PCI configuration register, and wherein the processor is further operative to provide to the second computerized device the code size value by outputting the code size value from the PCI configuration register, in response to a PCI configuration register read request issued by the second computerized device.

4. The computerized device of claim 1 further including a PCI address register readable by the processor, and wherein the processor is operative to receive the read address in the PCI address register.

5. The computerized device of claim 1 further including a cryptographic processor operative to encrypt the netboot code image.

6. The computerized device of claim 1 wherein the processor, the first memory, the first register, and the at least one buffer are fabricated on at least a portion of at least one printed circuit board associated with the second computerized device.

7. A method of loading a netboot code image into a computerized device having an associated memory, comprising the steps of:

receiving a read address corresponding to a netboot code image from a first computerized device by a second computerized device, the first computerized device having an associated first memory, the second computerized device having an associated second memory;

determining whether the read address is within an address range between a first base address associated with the first memory and the first base address plus a predetermined code size value by the second computerized device, the first base address being mapped to a base physical address identifying a physical address location within the second memory; and in the event the read address is within the address range, determining an offset between the read address and the first base address by the second computerized device, locating within the second memory a target address specified by the base physical address plus the offset to identify a target memory location at which the netboot code image is stored by the second computerized device, transferring the netboot code image stored at the target memory location to a buffer readable by the first computerized device, the netboot code image being transferred by the second computerized device, and reading the buffer by the first computerized device to load the netboot code image into the first memory.

8. The method of claim 7 wherein the netboot code image comprises a boot code image for predetermined network operating system software.

9. The method of claim 7 wherein the first determining step includes, in the event the read address is within the address range, providing an indication to a processor within the second computerized device.

10. The method of claim 7 further including the step of providing to the first computerized device the code size value by the second computerized device by outputting the code size value from a PCI configuration register within the second computerized device, in response to a PCI configuration register read request issued by the first computerized device.

11. The method of claim 7 further including the steps of:

determining an offset between the read address and the first base address by a processor;

locating within the second memory a target address specified by the base physical address plus the offset to identify a target memory location at which the netboot code image is stored by the processor;

reading the netboot code image stored at the target location by the processor; and storing the netboot code image in a buffer readable by the first computerized device, the netboot code image being stored by the processor.

12. The method of claim 7 wherein the step of receiving the read address from the first computerized device comprises receiving the read address in a PCI address register readable by a processor within the second computerized device.

13. The method of claim 7 wherein the second computerized device includes a cryptographic processor, and further including the step of encrypting the netboot code image by the cryptographic processor before the netboot code image is loaded into the first memory.

14. The method of claim 7 wherein the first computerized device and the second computerized device comprise respective computerized devices.

15. The method of claim 7 wherein the first computerized device comprises at least one first printed circuit board, and the second computerized device is fabricated on at least a portion of the first printed circuit board of the first computerized device.

16. The method of claim 7 wherein the second computerized device comprises a network adapter, and the first computerized device comprises a host computer communicably coupleable to the network adapter.

* * * * *